Figure 1:
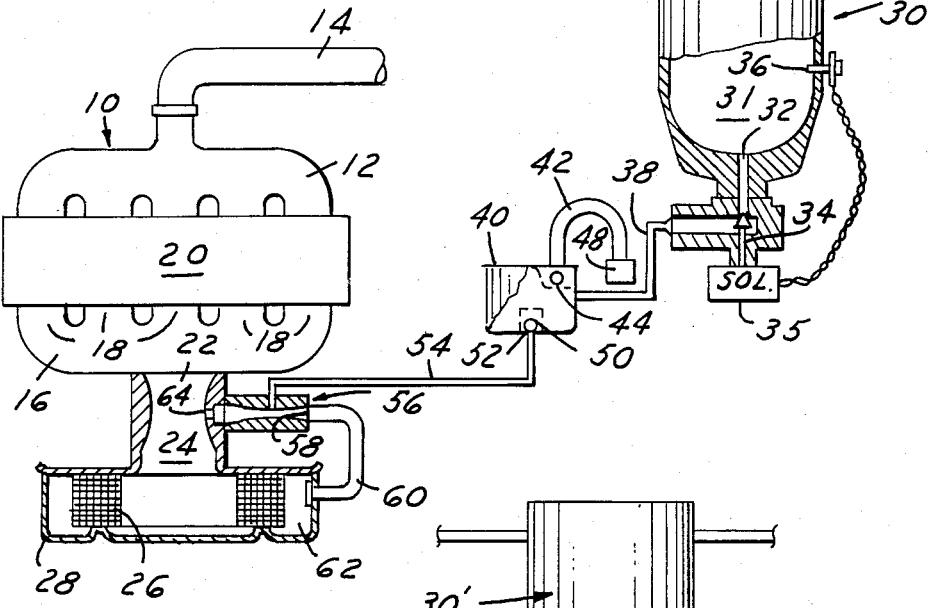

United States Patent [19]

Pakula

[11] Patent Number: 4,637,351

[45] Date of Patent: Jan. 20, 1987

[54] SYSTEM FOR REMOVAL OF WATER FROM DIESEL FUEL SYSTEMS

[75] Inventor: Benjamin J. Pakula, Dearborn, Mich.

[73] Assignee: Ford Motor Company, Dearborn, Mich.

[21] Appl. No.: 845,715

[22] Filed: Mar. 28, 1986

[51] Int. Cl.$^4$ ............... F02D 19/00; F02M 25/04; B01D 35/02

[52] U.S. Cl. ............... 123/25 J; 123/25 A; 210/86; 210/96.1; 210/97; 210/114; 210/128; 210/134; 210/143; 210/307; 210/313; 210/416.4

[58] Field of Search ............... 123/25 A, 25 J, 25 R; 210/86, 96.1, 97, 114, 128, 134, 143, 307, 313, 149, 416.4

[56] References Cited

U.S. PATENT DOCUMENTS

| | | | |
|---|---|---|---|
| 3,012,675 | 12/1961 | Phelps | 210/86 |
| 3,845,745 | 11/1974 | Dunlap | 123/25 J |
| 3,983,882 | 10/1976 | Billings | 123/25 A |
| 4,031,864 | 6/1977 | Crothers | 123/25 A |
| 4,066,545 | 1/1978 | Walters | 210/86 |
| 4,264,442 | 4/1981 | Jackson | 210/86 |
| 4,311,118 | 1/1982 | Slagle | 123/25 J |
| 4,321,136 | 3/1982 | Matsui | 210/86 |
| 4,388,893 | 6/1983 | Apfel | 123/25 J |
| 4,406,255 | 9/1983 | Goodman | 123/25 J |
| 4,411,224 | 10/1983 | Goodman | 123/25 A |
| 4,416,225 | 11/1983 | Constantine | 123/25 E |

FOREIGN PATENT DOCUMENTS 1125601  6/1982  Canada ............... 123/25 J

*Primary Examiner*—Ernest G. Therkorn
*Attorney, Agent, or Firm*—Robert E. McCollum; Clifford L. Sadler

[57] ABSTRACT

An automotive type diesel engine provided with a conventional fuel filter water separator has a solenoid operated drain or dump valve for removing liquid contaminant/water automatically when the contaminant or water reaches a predetermined level actuating a sensor. The removed contaminant or water is then inducted into the engine by means of a venturi/aspirator which in one embodiment has an outlet connected directly to the engine intake manifold to provide the necessary pressure drop or, in another turbocharged diesel engine embodiment, the boost pressure is connected to the inlet of the venturi/aspirator to again induct the liquid contaminant/water into and through the aspirator to be disposed of in the exhaust system of the engine, both embodiments thereby automatically providing for a complete disposal of liquid contaminant/water within the engine and thereby eliminating the need of a periodic draining of the same from the fuel filter by the vehicle operator, for example.

5 Claims, 2 Drawing Figures

SYSTEM FOR REMOVAL OF WATER FROM DIESEL FUEL SYSTEMS

This invention relates in general to an automotive type diesel engine fuel filter, and more particularly to one in which water or liquid contaminant separated from the oil is automatically drained and disposed of within a portion of the engine.

The use of water separators in diesel engine fuel filters is a well known expedient to rid the oil of contaminants that might cause a malfunction of the engine. Many of these consist merely of a water drainage reservoir at the bottom of the fuel filter connected by a drain tube simply to the ground or possibly to a container. Some are automatically operable; others, not. For example, some contain sensors activated when the water reaches a predetermined level in the reservoir to energize a signal light located on the dashboard of the vehicle to warn the driver of the need to drain the filter. Others include electrical means to operate a solenoid valve to automatically open the drain to a discharge pipe.

In most cases, the drain is simply a drain to ground. In some cases, the drain is connected via a complicated piping system to a portion of the engine to be disposed therein. For example, U.S. Pat. No. 4,066,545, Walters et al, shows a bilge water disposal system in which the separated water is piped through a complicated network to the exhaust portion of the engine for disposal therein. U.S. Pat. No. 3,012,675, Phelps et al, shows a water disposal system in which the drain pipe is opened by means of a solenoid operated valve. the pipe in FIG. 7 being connected by a line 77 to a reservoir 78 by means of a suction pump not shown.

This invention relates to a diesel engine fuel filter water or liquid contaminant disposal system in which the drained fluid is drawn into a fluid aspirator operated by engine intake air, in one embodiment, that sucks the fluid into the intake system of the engine; or, in another embodiment, sucks the water into the engine exhaust system. This is all provided by a simple system having few parts and automatically operable in response to operation of the engine. Thus, the liquid contaminant or water drained from the fuel filter is automatically disposed of within the engine so that the vehicle operator need not be burdened with this particular operation.

U.S. Pat. No. 4,264,442, Jackson, shows a diesel engine type fuel filter with a water or liquid contaminant separator and a reservoir 24. A ball check type drain valve 82 normally closes the drain but is opened when the water level reaches a sensor 64. The sensor then actuates a pair of contacts 66 to open a valve 74 and permit compressed air from an air pump source 96 to supply pressurized air into the channel or passage 88. This provides a pressure differential sufficient to unseat valve 82 and allow drainage of the liquid contaminant or water from the filter housing. In this case, there is no indication as to what becomes of the disposed liquid contaminant or water. Furthermore the system shown by Jackson requires the use of a separate air pump apparently used only for operating the drain valve 82.

It is a primary object of the invention, therefore, to provide a diesel engine fuel filter liquid contaminant or water disposal system that is simple in construction, has fewness of parts, and is connected to the engine to automatically dispose of the contaminant or water thereinto during normal operation of the engine by the means of a fluid aspirator operated by the passage of air flow to and through the engine. One embodiment of the invention is illustrated in connection with a naturally aspirated diesel engine in which air flow at essentially atmospheric pressure as indicated into the engine. A second embodiment is utilized in connection with a turbocharged diesel engine construction providing a source of boost manifold pressure at the induction portion of the engine.

Figure 2:
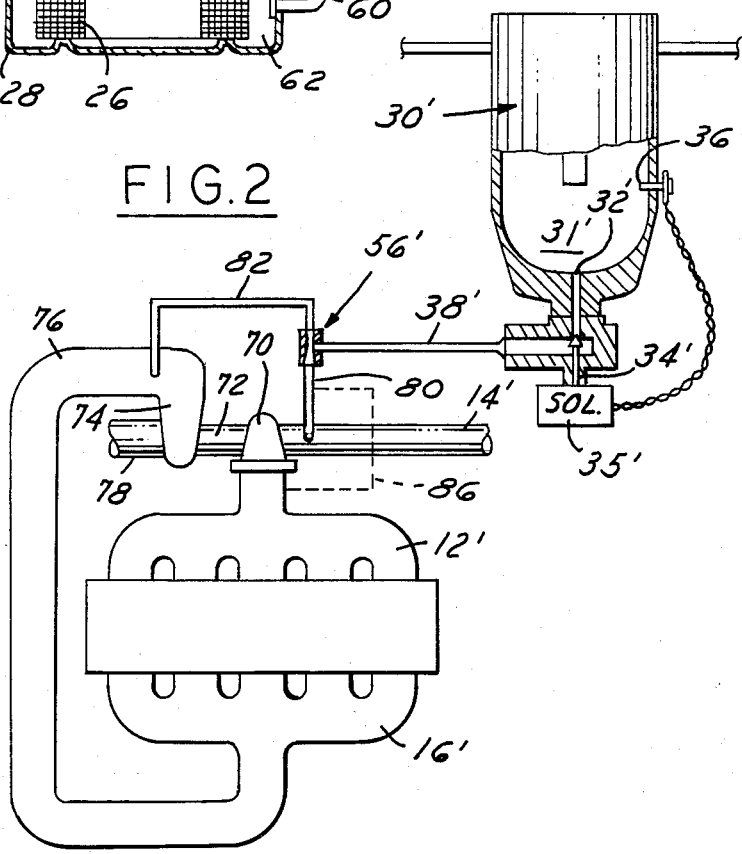

Other objects, features and advantages of the invention will become more apparent upon reference to the succeeding, detailed description thereof, and to the drawings illustrating the preferred embodiments thereof, wherein:

FIG. 1 schematically illustrates a portion of a naturally aspirated diesel engine. with parts broken away and in section, embodying the system of the invention for removal of water or liquid contaminant from an engine fuel filter; and FIG. 2 schematically illustrates a portion of a turbocharged diesel engine installation, with parts broken away and in section, embodying the system of the invention for removal of water or liquid contaminant from the diesel fuel filter.

FIG. 1 shows schematically the pertinent portions of a naturally aspirated diesel engine 10 associated with the invention. In this case, the engine is shown in top plan view as a six-cylinder in-line installation having on one side an exhaust manifold 12 connected to an exhaust pipe system 14 for the removal of exhaust gases from the engine. The other side of the engine includes an intake manifold 16 having individual runners 18 connected to the intake side of a cylinder head 20 of the engine and to the discharge portion 22 of the main air induction passage 24 of the engine. A conventional dry element annular air cleaner 26 also is provided within the usual air inlet housing 28.

Associated with the engine is a fuel oil filter indicated in general at 30. It may be of a known construction for separating water or other liquid contaminant from the fuel oil. For example, it could be as is shown in U.S. Pat. No. 4,321,136, Matsui, or similar to that shown in U.S. Pat. No. 4,264,442, Jackson, previously referred to, both of which are incorporated herein by reference. In both instances, the fluid passing through the fuel filter causes separation of foreign liquid from the supply liquid fuel, the foreign liquid then falling by gravity into a lower reservoir 31 to be eventually evacuated therefrom.

In the particular case shown here, the filter housing is provided with a drainage opening 32 that is closed by a solenoid operated valve 34. A water or liquid contaminant sensor 36 is energized when a pair of contacts is closed by the water reaching the level of the sensor. This connects the solenoid 35 to a source of electrical energy, not shown, to thereby open the drain valve 34 to connect reservoir 31 to a drain line 38. The latter is connected at its opposite end to a second reservoir 40. The upper portion of reservoir 40 is connected by a vent pipe 42 to atmosphere past an inlet float type ball check valve 44 and an outlet ball check valve 48. It will be clear that so long as the liquid in reservoir 40 is below the level of the ball check valve 44, the vapor or fluid at the top of the reservoir will be at atmospheric pressure due to venting through the outlet 42. If the pressure level should drop below atmospheric the ball check valve 48 would open to equalize the pressures.

The bottom of reservoir 40 contains a float-type ball valve 50 that closes a drain opening 52 only when the reservoir is empty to prevent a backflow of any material or fluid in drain line 54 into the reservoir. The drain opening is connected to a further drain pipe 54.

Drain line 54 in this case is connected through its outer wall to the interior of an aspirator 56. The latter could consist simply of a venturi-like construction whereby fluid or liquid passing longitudinally through the same from end to end provides a pressure differential or pressure drop sufficient to permit the atmospheric pressure in drain line 54 to flow the water or liquid contaminant into the aspirator/venturi.

In this particular case, the inlet 58 to the aspirator is connected by a pipe 60 to the atmospheric pressure side 62 of air filter 26. The outlet 64 of aspirator 56 in this case projects through a hole in the wall of the engine main induction passage 24 to be subjected to the lower pressure air flow (vacuum) into the engine at this point. That is, the engine manifold vacuum level being lower than that of the essentially atmospheric pressure level at the air cleaner inlet induces or provides the necessary differential pressure from inlet to outlet of the venturi-type aspirator, thereby causing a flow of the water or liquid contaminant in drain line 54 into and through the aspirator and into the intake manifold proper of the engine to thereby be disposed of therein.

Thus, it will be seen that the construction shown and described provides a simple means for automatically disposing into the engine of the liguid contaminant seperated from the oil in the fuel filter by means of a simple aspirator operated by engine air flow. The venturi in this case draws the water from the reservoir and atomizes it, which is then inducted into the intake manifold and cylinders where it is burned with the fuel and exhausted through the exhaust manifold 12. The reservoir 40 ensures that the water or liquid contaminant is at atmospheric pressure so that it will atomize in the venturi/aspirator in the same manner as fuel is inducted in a carburetor induction passage in a known manner.

FIG. 2 shows the water or liquid contaminant disposal system of the invention applied to a turbocharged diesel engine installation. In this instance, the engine exhaust manifold 12' is connected to the exhaust piping 14' past an exhaust gas driven turbine wheel (not shown) contained in a housing 70. The turbine would have a shaft 72 rigid therewith and rigid with a radial flow or similar type air compressor wheel (also not shown) contained in a housing 74 in axial alignment with the turbine 70.

Details of construction and operation of the turbine and compressor are well known, and, therefore, are not repeated here. Suffice it to say that the engine exhaust gases would drive the turbine wheel, which then in turn drives the compressor wheel to discharge compressed air into a line 76. Atmospheric air from a conventional air cleaner would be connected by an inlet 78 to the inlet of the compressor. The ducting or manifolding 76 would be connected as shown to the engine inlet manifold 16', the compressor providing above atmospheric pressure or boost pressure to the intake portion of the engine for operation in a known manner.

The FIG. 2 construction again shows an essentially conventional fuel filter assembly 30' having a water or liquid contaminant reservoir 31' at its lower end, and a solenoid operated drain valve 34'. The latter is opened when the water or liquid contaminant level reaches a sensor 36' which then actuates the solenoid 35' to open the drain valve 34' to dispose of the contaminant into a drain line 38'. In this case, the liquid reservoir 40 shown in FIG. 1 is not provided. Instead, the disposal line 38' is connected directly to the interior of the venturi/aspirator 56', which has an outlet line 80 connected directly to the exhaust piping 14'. In this case, the inlet of the venturi/aspirator is connected by a line 82 that is branched from the boost pressure conduit 76. This provides the above atmospheric pressure essential or necessary to establish a pressure differential between the inlet and outlet of the venturi/aspirator to lower the pressure therein and provide for the induction of the drainage water or liquid contaminant in line 38' into the venturi and through it to the outlet or exhaust line 14'. An alternate connection from the venturi could be as indicated in dotted lines 86 connecting the drainage water or liquid contaminant directly to the engine exhaust manifold for atomization.

The operation is believed to be clear from a consideration of the above and the drawings, and, therefore, will not be repeated. From the foregoing, it will be seen that the invention provides a simple system for disposing of water or liquid contaminant drained from the diesel engine fuel filter, and one that eliminates the need for periodic draining of water from the fuel by a vehicle operator, for example. The system continuously removes water/hydrous condensation from the diesel fuel system, which otherwise might cause damage or corrosion to the fuel system components and/or a malfunction or flame-out of the engine, especially in cold weather operation when waxing of the fuel is more prevalent.

While the invention has been shown and described in its preferred embodiments, it will be clear to those skilled in the arts to which it pertains that many changes and modifications may be made thereto without departing from the scope of the invention.

I claim:

1. A system for automatically removing liquid contaminant/water from a fuel filter of a diesel engine by the use of air flow through the engine, the filter having a drain opening at atmospheric pressure for removing water separated from the fuel, a drain line connected at one end to the drain opening and at its other end into a fluid aspirator, the aspirator when operable establishing a pressure differential therein sufficient to induce the drain water thereinto and therefrom, means connecting air that flows through the engine to and through the aspirator during engine operation to render the aspirator operable, and means connecting the water from the aspirator to a portion of the engine for disposal herein.

2. A system as in claim 1, including a water reservoir in the water line between the drain opening and aspirator, the reservoir being maintained at atmospheric pressure.

3. A system as in claim 1, the engine having an air induction passage, the aspirator having one end opening into the induction passage for exposure to engine manifold vacuum therein to create an air flow through the aspirator for the induction of the liquid contaminant/water thereinto.

4. A system as in claim 1, the engine including a turbocharger assembly including an exhaust gas driven turbine driven compressor providing a source of above atmospheric boost pressure air, manifolding connecting the boost pressure air to the engine induction system, and a branch passage connecting the boost pressure air to and through the aspirator rendering it operable to induct the drain water thereinto for discharge therefrom.

5. A system as in claims 1 or 4, including a solenoid controlled dump valve in the drain opening; and sensor means responsive to the buildup of liquid contaminant/water to a predetermined level in the fuel filter to actuate the solenoid to open the dump valve.

* * * * *